United States Patent Office 3,426,214
Patented Feb. 4, 1969

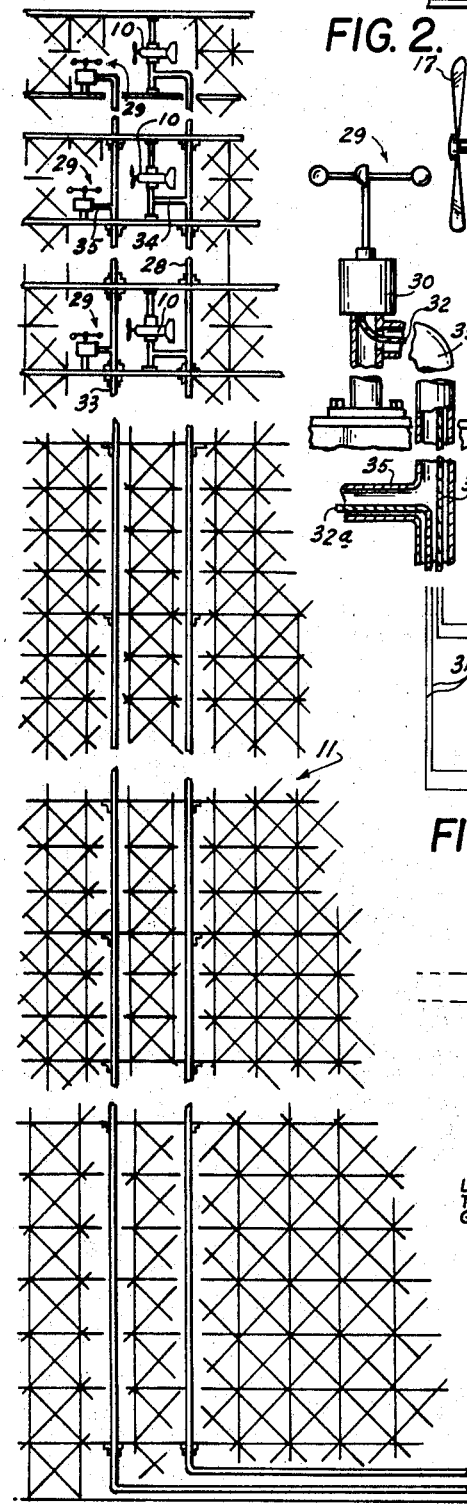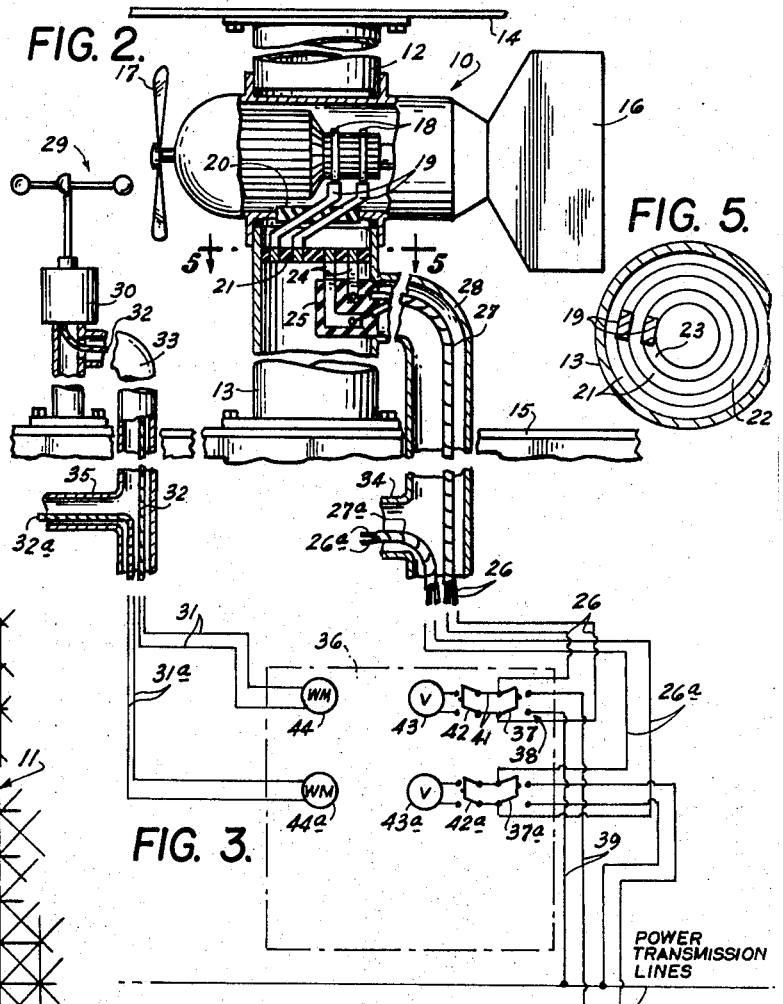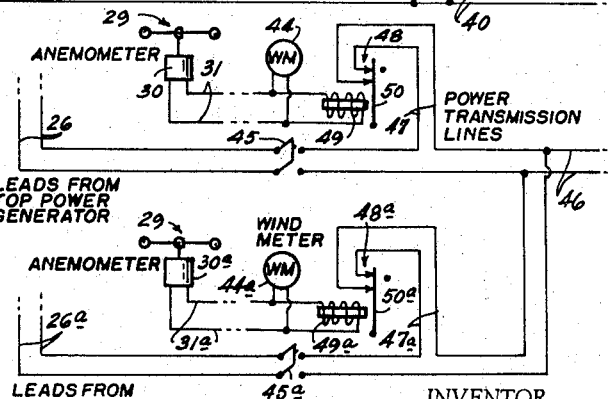

3,426,214
ELECTRIC POWER GENERATING SYSTEM
Martin J. O'Malley, 222 Paulson Ave.,
Passaic, N.J. 07055
Filed Feb. 7, 1966, Ser. No. 525,599
U.S. Cl. 290—55                                5 Claims
Int. Cl. F03d 9/00; H02p 9/04

ABSTRACT OF THE DISCLOSURE

An electric power generating system adapted to have its generators driven by high velocity winds has each generator provided with means for facing it into the wind and rotatably supported between two aligned rigid column sections whereby the generators are constrained against vertical movement by winds blowing in a direction other than truly horizontal.

---

This invention relates to wind driven or operated electric generators, and more particularly to a construction utilizing the energy of high winds which blow continuously at very high altitudes; and example of such winds is the so-called jet stream.

Such winds blow throughout a layer of substantial thickness, but the direction of the winds is subject to variation as is also the altitude of the layer.

An object of the present invention is the provision of an electric power generating system wherein a plurality of wind driven generators are pivotally mounted at vertically spaced distances and provided with means for automatically heading them into the wind, whence at least one of the generators will be activated regardless of the altitude of the prevailing wind.

Another object of the invention is the provision of an arrangement whereby the plurality of generators are connected in parallel and means is provided for automatically disconnecting a generator when its wind-driven speed falls below a given value and for automatically reconnecting it in circuit when the said speed increases above the said given value.

Herein but a single generating station is disclosed, but it is contemplated to have a multiple of such stations spaced at suitable distances from each other in what may be termed a network.

The above broad as well as additional and more specific objects are clarified in the following description wherein reference numerals designate like-numbered parts in the accompanying drawing. It is to be noted that the drawing is intended primarily for the purpose of illustration and that it is therefore neither desired nor intended to limit the invention necessarily to any or all of the exact details shown or described.

Referring briefly to the drawing, wherein an embodiment of the invention is disclosed, FIG. 1 is a fragmentary, largely diagrammatic, elevational view of a high tower having a plurality of vertically spaced wind driven electric generators mounted thereon.

FIG. 2 is an enlarged fragmentary elevational view with parts broken away and partly in section, of a single generator and accessory parts mounted at one vertical position on the tower.

FIG. 3 is a wiring diagram associated with a panel shown in phantom which may be situated at any suitable place at the base of the tower, showing a control set up for an operator or attendant.

FIG. 4 is a wiring diagram illustrating an automatic control.

FIG. 5 is a sectional view taken on the line 5—5 of FIG. 2.

Referring in detail to the drawing, three wind driven generators are shown in FIG. 1 in vertically spaced positions at the top of a high tower 11 whose height is sufficient to extend into the high wind or jet stream layers of the atmosphere. That number of generators has been shown merely by way of example, and it may be sufficient, but the intention is to have a sufficient number properly spaced vertically to assure that the high winds at their levels which change from time to time, will effect actuation of at least one generator at all times.

In FIG. 2 a generator 10 is shown pivotally or rotatably mounted on a vertical axis between aligned column sections 12 and 13 supported by horizontal cross-members 14 and 15 of the tower, the section 12 extending downward from the member 14 and the section 13 extending upward from the member 15. The generator has an enlarged tail 16 designed to effect its being always turned into the wind so that its propeller or the like 17 may be activated by the wind. Current from the generator is taken off slip rings 18 by brushes 19, which extend downward through an insulated disc 20 rigid with the bottom of the generator housing. Rigid in the upper end of the column 13 is an insulated disc 21 having concentric contact rings 22, 23 engaged by the brushes 19. Connectors 24 leading into an insulating block 25 connect with the generator leads 26 passing through a steel cable 27 confined within a pipe 28 joined to the column 13. It is thus apparent that current from the generator will pass down through the leads 26.

Also mounted at any suitable position on, for example, a cross-member such as that at 15, is an anemometer 29 coupled to a generator 30 which may be of the magneto type, whence the current generated by rotation of the anemometer propeller is directly proportional to its speed of rotation.

The leads 31 from the anemometer generator pass downward through a two-conductor cable 32 contained within a pipe 33. At 34 is shown a branch of the pipe 28 through which a cable 27a holding the leads 26a from the next lower generator 10, enters the pipe 28. In like manner the pipe 33 has a branch 35 through which a cable 32a carries the leads 31a from the next lower anemometer generator and so on according to the number of generators 10 and their accompanying anemometers.

FIG. 3 shows a panel 36 in phantom having switches and wind speed indicators, or wind meters thereon, for observation and control by an attendant. The power leads 26 are shown connected to switch terminals of a switch 37, the switch contacts 38 being connected by leads 39 to power transmission lines 40. The switch 37 is normally closed. Leads 41, connected to a switch 42, permits carrying current into a voltmeter 43; when it is desired to ascertain the voltage delivered by the top generator 10 the switch 42 is closed, or it may remain closed so that such voltage may be reported at all times. In case any fault should occur in any part of the circuit including leads 26 and the generator, or for repairs, the switch 37 is opened. On the panel adjacent the voltmeter 43 (the voltmeters are indicated by the legend "V" thereon) is its corresponding wind speed indicator or wind meter 44 bearing the legend "WM," to which the leads 31 are connected. The wind meters may be voltmeters or ammeters, preferably the former, graduated, preferably, in wind speed at miles per hour or any other suitable unit. When the attendant notes that the wind speed for any anemometer, which means the wind speed applicable to its corresponding generator 10, fall below a given level, he may open the switch 37 to disconnect that generator. Correspondingly, when the speed is indicated as exceeding the given rate, he may close the switch 37. Thus whichever generator (or generators) is subjected to sufficiently strong winds may be connected into the power line 40, while those reporting insufficient speed may be disconnected. Merely for the purpose of illustration, only a second set of elements 43a, 42a 37a and 44a are additionally shown on the panel 36, all equivalent to similarly numbered parts without the suffix a, to illustrate how the next lower generator 10 may be observed and controlled in the same manner as described for the top generator 10.

FIG. 4 shows a wiring diagram for automatic control of the system; the various elements illustrated may obviously also be mounted on a suitable panel which it is believed unnecessary to discuss. Herein the leads 26 lead through a switch 45 to power transmission lines 46. However, interposed in series with one line 46 is a circuit including leads 47 and relay contacts 48 adapted to be closed by the energization of relay solenoid 49, which is connected to the anemometer generator 30. The windmeter 44 is shown bridged across the leads 31 for observational purposes whenever desired.

The switch 45 is normally kept closed. When the anemometer rotates at a sufficient speed to generate a sufficient voltage across the relay terminals the relay armature 50 will be attracted to close the circuit through the power lines 46, as at such a predetermined point the wind driving the generator propeller 17 will be sufficient to cause the generator to generate a sufficient voltage for delivery to the power lines. Conversely, when the anemometer voltage drops below such point, the relay will open and thus disconnect the generator 10. FIG. 4 also shows a similar automatic control arrangement for the leads 26a from the next lower generator 10, with similar parts bearing the same reference numeral followed by the suffix a. Thus, as the altitude of the sufficiently high winds varies from one level to another, the generator or generators 10 facing into sufficiently strong winds will deliver power to the power lines while the generator or generators facing insufficiently strong winds will be inactivated.

While the herein described generating and power delivery system is adapted to both AC and DC, it is particularly adaptable to the latter which is becoming more frequently used in power transmission systems. Shunt wound generators possess a large degree of voltage regulation to maintain a constant voltage, but many means and devices are available for regulating voltage. Moreover, well known means may be provided, if deemed advisable, to disconnect a generator whose speed may be deemed excessive, as well as means built into the generator housing to lock the propeller against rotation when its speed exceeds a given rate of rotation.

As the present invention contemplates continuous generation of power from one or more of the plurality of generators mounted on the tower, there is no need for the use of storage batteries although, if desired, such could be made use of for storing excess power when the latter is available.

A generating system such as that disclosed herein provides economical electric power generation after the initial cost of construction has been liquidated, and the erection of very high towers as herein contemplated is a not impractical undertaking.

The invention having thus been described, what is claimed and desired to be secured by Letters Patent is as follows:

1. An electric power generating system including a high-tower having vertically spaced rigid horizontal members defining spaces therebetween, each of said members at a high elevation in the tower having an upper column section supported thereon and extending downward therefrom, a lower column section aligned with said upper column section extending upward from the next lower member, a power generator rotatably mounted between said column sections in each of said column spaces whereby the generators are constrained against vertical movement, the power generators having means for positioning the same into the wind, each of the power generators having means for tapping current therefrom, leads extending from each of said current tapping means to a position near the ground, the tower having a number of anemometers equal to the number of said power generators mounted thereon, each of said anemometers being substantially at the same level as one of said power generators, each of said anemometers having a generator connected thereto for actuation by the anemometer, leads extending from each of the anemometer generators downward to said position near the ground, said leads from said power generators being connected in parallel to transmission lines, a number of electric meters positioned near the ground, each of said meters being connected to said leads from one of the anemometer generators for indicating the speed of the wind at the level of the anemometer, and means also positioned near the ground for selectively connecting or disconnecting said power generators with said transmission lines.

2. An electric power generating system according to claim 1, said last-named means including automatic means for connecting each of said power generators with the transmission lines when the voltage generated by the corresponding anemometer generator rises above a given amount and for disconnecting the same from the transmission lines when said voltage falls below said given amount.

3. An electric power generating system according to claim 2, said automatic means comprising a relay which includes a solenoid, switch contacts and an armature, said solenoid being connected in circuit with said anemometer generator leads, said switch contacts being connected in series with at least one of said transmission lines and being connected in series with at least one of said transmission lines and being adapted to be engaged by said armature when said voltage rises above said given amount and disengaged therefrom when said voltage falls below said given amount.

4. An electric power generating system according to claim 2, a pipe extending downward from the topmost of said lower column sections to substantially said position near the ground, said pipe having a lateral branch connected to each of said lower column sections, said leads from each of the power generators passing through an opening in the lower column section into the branch connected thereto and thence down through said pipe.

5. An electric power generating system according to claim 4, said tower having a second pipe extending downward from the topmost anemometer generator to substantially said position near the ground, said second pipe having a lateral branch connected to each of said anemometer generators, said leads from each of said anemometer generators passing into the branch connected thereto and thence down through said second pipe.

References Cited

UNITED STATES PATENTS

| 1,142,538 | 6/1915 | Snee et al. | 290—44 X |
| 1,876,595 | 9/1932 | Beldimano | 290—55 X |
| 2,106,557 | 1/1938 | Putman | 290—44 |

ORIS L. RADER, *Primary Examiner.*

W. E. DUNCANSON, *Assistant Examiner.*